US009687878B2

(12) United States Patent
Galloway et al.

(10) Patent No.: US 9,687,878 B2
(45) Date of Patent: Jun. 27, 2017

(54) LOCATING FEATURE FOR SCREEN

(75) Inventors: Claire Galloway, Scotland (GB); Andrew Ralph, Scotland (GB)

(73) Assignee: United Wire Limited, Edinburgh (GB)

( * ) Notice: Subject to any disclaimer, the term of this patent is extended or adjusted under 35 U.S.C. 154(b) by 326 days.

(21) Appl. No.: 13/128,060

(22) PCT Filed: Nov. 19, 2009

(86) PCT No.: PCT/EP2009/065502
§ 371 (c)(1),
(2), (4) Date: May 6, 2011

(87) PCT Pub. No.: WO2010/057956
PCT Pub. Date: May 27, 2010

(65) Prior Publication Data
US 2011/0215047 A1    Sep. 8, 2011

Related U.S. Application Data

(60) Provisional application No. 61/116,522, filed on Nov. 20, 2008.

(51) Int. Cl.
*B01D 39/10* (2006.01)
*B23P 17/04* (2006.01)
*B07B 1/46* (2006.01)

(52) U.S. Cl.
CPC .............. *B07B 1/46* (2013.01); *B01D 39/10* (2013.01); *B07B 2201/02* (2013.01); *B23P 17/04* (2013.01); *Y10T 29/49826* (2015.01)

(58) Field of Classification Search
CPC .. B07B 1/46; B07B 2201/02; Y10T 29/49826
USPC ........... 210/499, 384, 388; 29/428; 209/404, 209/405, 408–412
See application file for complete search history.

(56) References Cited

U.S. PATENT DOCUMENTS

| 5,641,071 A * | 6/1997 | Read et al. .................... 209/319 |
| 6,769,550 B2 | 8/2004 | Adams et al. |
| 6,935,511 B2 * | 8/2005 | Seyffert et al. ............... 209/404 |
| 7,175,027 B2 | 2/2007 | Strong et al. |
| 2005/0167341 A1 | 8/2005 | Bacho et al. |
| 2006/0108264 A1 | 5/2006 | Moore et al. |
| 2006/0180509 A1 * | 8/2006 | Burnett et al. ................ 209/405 |
| 2007/0227954 A1 * | 10/2007 | Nogalski ....................... 209/404 |

FOREIGN PATENT DOCUMENTS

| EP | 0 036 486 A1 | 9/1981 |
| WO | 2005/092523 A1 | 10/2005 |

(Continued)

OTHER PUBLICATIONS

International Search Report issued in PCT/EP2009/065502, mailed on Mar. 15, 2010, 3 pages.

(Continued)

*Primary Examiner* — Madeline Gonzalez
(74) *Attorney, Agent, or Firm* — Osha Liang LLP (57) ABSTRACT

A vibratory separator screen assembly, the screen assembly including a frame having a top surface and a bottom surface having a tapered recess configured to receive a locating element disposed on the vibratory separator. The system also includes a screen element

20 Claims, 5 Drawing Sheets

(56) References Cited

FOREIGN PATENT DOCUMENTS

WO  WO2005/092523  * 10/2005
WO  2006018664 A1  2/2006

OTHER PUBLICATIONS

Written Opinion issued in PCT/EP2009/065502, mailed on Mar. 15, 2010, 7 pages.
Office Action Issued in Chinese Application No. 200980146172.7, Dated: Dec. 4, 2012 (10 Pages with English Translation).
Office Action in counterpart Chinese Patent Application No. 200980146172.7 issued Jan. 13, 2014 (13 pages).
Office Action in counterpart Mexican Patent Application No. MX/a/2011/005271 issued Feb. 7, 2014, with English correspondence (5 pages).
Office Action in corresponding Mexican Application No. MX/a/2011/005271 dated Aug. 29, 2013 (12 pages).
Office Action in counterpart Chinese Patent Application No. 200980146172.7 issued Jun. 5, 2014 (15 pages).
Third Official Action issued in corresponding Mexican Application No. MX/a/2011/005271 with English correspondence; Dated Jun. 16, 2014 (5 pages).
Reexamination Notification issued in corresponding Chinese Application No. 200980146172.7; Dated Aug. 19, 2015 (9 pages).
Office Action issued in Chinese Patent Application No. 200980146172.7; Dated Apr. 20, 2016 (6 pages).
Office Action issued in Argentine Application No. 20090104490; Dated Jul. 11, 2016 (5 pages).
Office Action issued in Chinese Application No. 200980146172.7; Dated Nov. 1, 2016 (7 pages).
Second Office Action w/translation in corresponding Chinese Application No. 200980146172.7, dated Aug. 20, 2013 (9 pages).

* cited by examiner

LOCATING FEATURE FOR SCREEN

BACKGROUND

Field of the Disclosure

Embodiments disclosed herein relate generally to screen assemblies for vibratory separators. More specifically, embodiments disclosed herein relate to screen assemblies having handles for positioning in vibratory separators. More specifically still, embodiments disclosed herein relate to screen assemblies having locating features for positioning in vibratory separators.

Background Art

Oilfield drilling fluid, often called "mud," serves multiple purposes in the industry. Among its many functions, the drilling mud acts as a lubricant to cool rotary drill bits and facilitate faster cutting rates. Typically, the mud is mixed at the surface and pumped downhole at high pressure to the drill bit through a bore of the drillstring. Once the mud reaches the drill bit, it exits through various nozzles and ports where it lubricates and cools the drill bit. After exiting through the nozzles, the "spent" fluid returns to the surface through an annulus formed between the drillstring and the drilled wellbore.

Furthermore, drilling mud provides a column of hydrostatic pressure, or head, to prevent "blow out" of the well being drilled. This hydrostatic pressure offsets formation pressures thereby preventing fluids from blowing out if pressurized deposits in the formation are breeched. Two factors contributing to the hydrostatic pressure of the drilling mud column are the height (or depth) of the column (i.e., the vertical distance from the surface to the bottom of the wellbore) itself and the density (or its inverse, specific gravity) of the fluid used. Depending on the type and construction of the formation to be drilled, various weighting and lubrication agents are mixed into the drilling mud to obtain the right mixture. Typically, drilling mud weight is reported in "pounds," short for pounds per gallon. Generally, increasing the amount of weighting agent solute dissolved in the mud base will create a heavier drilling mud. Drilling mud that is too light may not protect the formation from blow outs, and drilling mud that is too heavy may over invade the formation. Therefore, much time and consideration is spent to ensure the mud mixture is optimal. Because the mud evaluation and mixture process is time consuming and expensive, drillers and service companies prefer to reclaim the returned drilling mud and recycle it for continued use.

Another significant purpose of the drilling mud is to carry the cuttings away from the drill bit at the bottom of the borehole to the surface. As a drill bit pulverizes or scrapes the rock formation at the bottom of the borehole, small pieces of solid material are left behind. The drilling fluid exiting the nozzles at the bit acts to stir-up and carry the solid particles of rock and formation to the surface within the annulus between the drillstring and the borehole. Therefore, the fluid exiting the borehole from the annulus is a slurry of formation cuttings in drilling mud. Before the mud can be recycled and re-pumped down through nozzles of the drill bit, the cutting particulates must be removed.

Apparatus in use today to remove cuttings and other solid particulates from drilling fluid are commonly referred to in the industry as "shale shakers." A shale shaker, also known as a vibratory separator, is a vibrating sieve-like table upon which returning solids laden drilling fluid is deposited and through which clean drilling fluid emerges. Typically, the shale shaker is an angled table with a generally perforated filter screen bottom. Returning drilling fluid is deposited at the feed end of the shale shaker. As the drilling fluid travels down length of the vibrating table, the fluid falls through the perforations to a reservoir below leaving the solid particulate material behind. The vibrating action of the shale shaker table conveys solid particles left behind until they fall off the discharge end of the shaker table. The above described apparatus is illustrative of one type of shale shaker known to those of ordinary skill in the art. In alternate shale shakers, the top edge of the shaker may be relatively closer to the ground than the lower end. In such shale shakers, the angle of inclination may require the movement of particulates in a generally upward direction. In still other shale shakers, the table may not be angled, thus the vibrating action of the shaker alone may enable particle/fluid separation. Regardless, table inclination and/or design variations of existing shale shakers should not be considered a limitation of the present disclosure.

Because shale shakers are typically in continuous use, any repair operations and associated downtimes are to be minimized as much as possible. Often, the filter screens of shale shakers, through which the solids are separated from the drilling mud, wear out over time and need replacement. Therefore, shale shaker filter screens are typically constructed to be quickly and easily removed and replaced. Generally, through the loosening of only a few bolts, the filter screen can be lifted out of the shaker assembly and replaced within a matter of minutes. While there are numerous styles and sizes of filter screens, they generally follow similar design. Typically, filter screens include a perforated plate base upon which a wire mesh, or other perforated filter overlay, is positioned. The perforated plate base generally provides structural support and allows the passage of fluids therethrough, while the wire mesh overlay defines the largest solid particle capable of passing therethrough.

A typical shale shaker filter screen includes a plurality of hold-down apertures at opposite ends of the filter screen. These apertures, preferably located at the ends of the filter screen that will abut walls of the shale shaker, allow hold down retainers of the shale shaker to grip and secure the filter screens in place. However, because of their proximity to the working surface of the filter screen, the hold-down apertures must be covered to prevent solids in the returning drilling fluid from bypassing the filter mesh through the hold-down apertures.

Additionally, hold-down apertures of typical screens may result in a time consuming process of installing and replacing the screens, as each hold-down aperture is secured individually. Installation and replacement of screens with hold-down apertures may also result in screens misaligned within the separator, potentially resulting in lost drilling fluid, environmental contamination, and damage to the separator.

Accordingly, there exists a need for handles and locating devices for vibratory separators.

SUMMARY OF THE DISCLOSURE

In one aspect, embodiments disclosed herein relate to a screen assembly for a vibratory separator, the screen assembly including a frame having a top surface and a bottom surface having a tapered recess configured to receive a locating element disposed on the vibratory separator. The system also includes a screen element disposed on the frame.

In another aspect, embodiments disclosed herein relate to a frame for a vibratory separator screen, the frame including a first end, a second end opposite the first end, a top surface, and a bottom surface having a tapered recess configured to receive a locating element of a vibratory separator.

In another aspect, embodiments disclosed herein relate to a method of installing a screen into a vibratory separator, the method including engaging a bottom surface of a screen frame with a top surface of the vibratory separator and sliding the screen frame over a locating element disposed on the top surface of the vibratory separator. The method further includes contacting the locating element of the vibratory separator with a tapered recess of the screen frame, wherein the tapered recess guides the screen frame into position on the top surface of the vibratory separator.

In another aspect, embodiments disclosed herein relate to a vibratory separator screen attachment system, the system including a vibratory separator including a basket, the basket including a locating element disposed on a top surface of the deck. The system further includes a screen frame having a first end, a second end, a top surface, and a bottom surface, the bottom surface of the first end including a recessed portion configured to receive the locating element of the deck.

Other aspects and advantages of the invention will be apparent from the following description and the appended claims.

DETAILED DESCRIPTION

In one aspect, embodiments disclosed herein relate to screen assemblies for vibratory separators. More specifically, aspects disclosed herein relate to screen assemblies having handles for positioning in vibratory separators. More specifically still, aspects disclosed herein relate to screen assemblies having locating features for positioning in vibratory separators.

Attachment mechanisms for attaching screens to vibratory separators may include physical devices (e.g., nuts and bolts), which may be used to secure the screens to the deck of the vibratory separator, and in certain vibratory separators, the attachment mechanism for attaching screens to the vibratory separator may include a hole and pin system. Embodiments disclosed herein provide locating features for vibratory separator screens that secure the screen to the vibratory separator deck, as well as allow for the screen to be self-locating. Such locating features may include geometric features on the vibratory separator or the screen frame, and may also facilitate the positioning of the screen frames within the vibratory separator.

Figure 1:
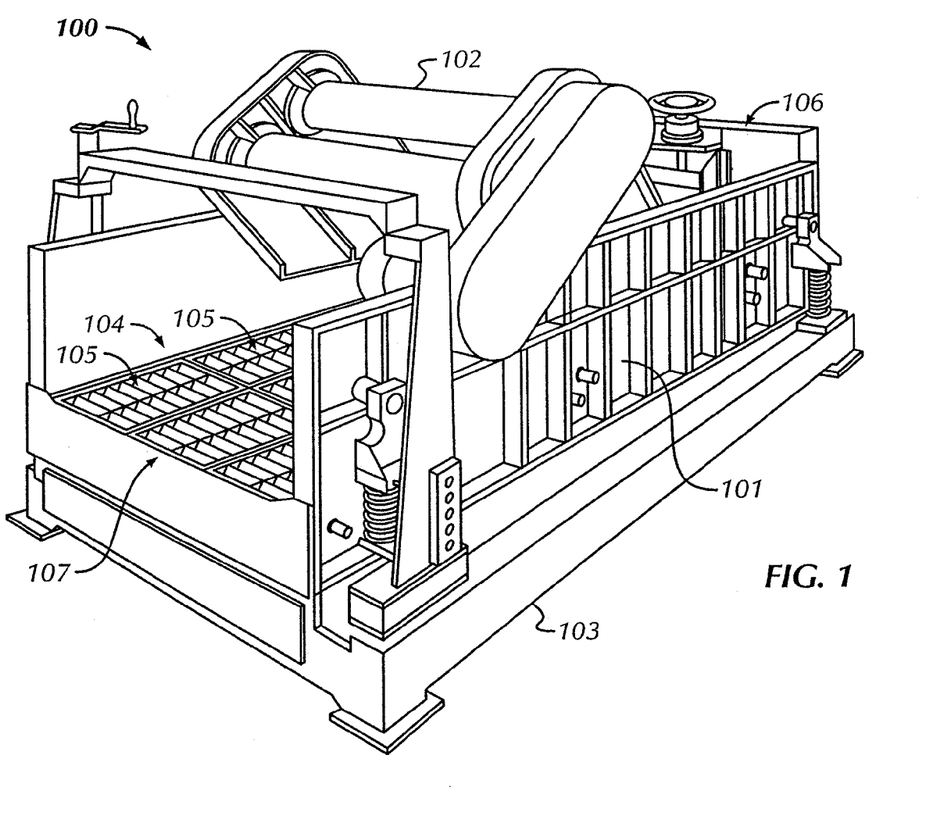
FIG. 1 is a perspective view of a vibratory separator according to embodiments of the present disclosure.

Referring initially to FIG. 1, a vibratory separator according to embodiments of the present disclosure is shown. In this embodiment, vibratory separator 100 includes sidewalls 101, eccentric motors 102, and a base 103. Internal to sidewalls 101, vibratory separator 100 includes a basket 104, into which one or more screens 105 may be disposed.

Vibratory separator 100 operates by rotating weights of eccentric motors 102, such that a select motion is imparted to basket 104. The motion imparted to basket 104 transfers to screens 105, thereby moving materials deposited thereon from a loading portion 106 of vibratory separator 100 to a discharge portion 107 of vibratory separator 100. Those of ordinary skill in the art will appreciate that the general operation of vibratory separators 100 is well known in the art, and the type of vibratory separator motion, style, or configuration is not an express limitation of the present application. Accordingly, the apparatus, systems, and methods disclosed herein may be used with any type of vibratory separator 100 configured to receive screens 105 having the herein disclosed locating features.

Figure 2:
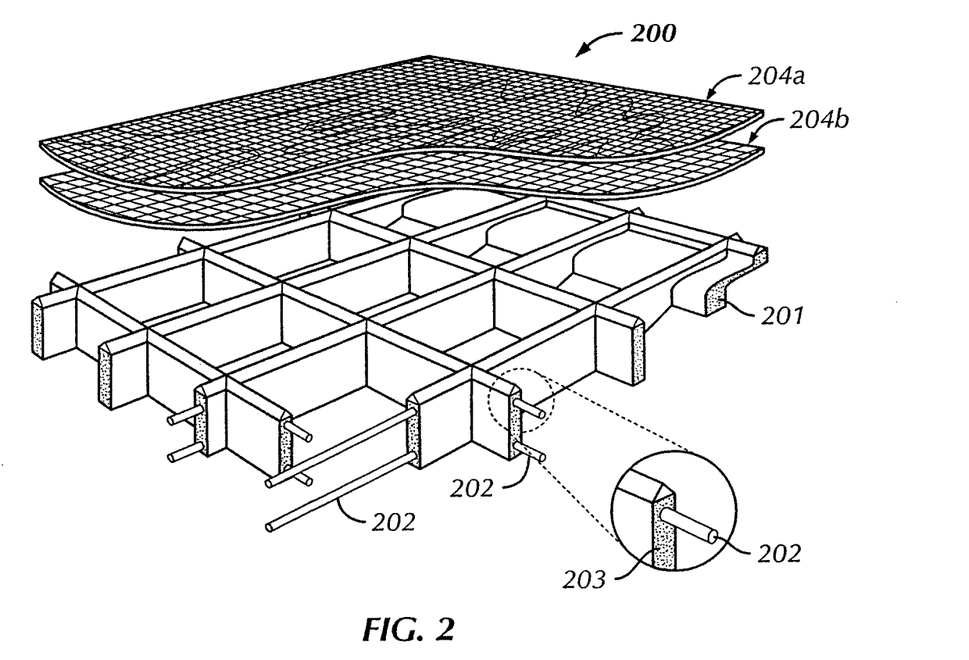
FIG. 2 is a breakaway view of a vibratory separator screen according to embodiments of the present disclosure.

Referring to FIG. 2, a breakaway perspective view of a screen according to embodiments of the present disclosure is shown. In this embodiment, a screen 200 includes a frame 201 formed from a wire frame 202 encased in a polymer material 203. Exemplary polymers may include, for example, polypropylene reinforced with glass fiber, as well as thermoplastic material. Screen 200 also includes multiple screening elements 204A and 204B having different size perforations (e.g., fine layer 204A and coarse layer 204B). In some aspects, screening element 204 may include a mesh, a fine screen cloth, or other materials known to one of ordinary skill in the art. Additionally, screening elements 204 may be formed from plastics, metals, alloys, fiberglass, composites, and polytetrafluoroethylene. In still other aspects, screen 200 may include a single screening element 204.

Figure 3:
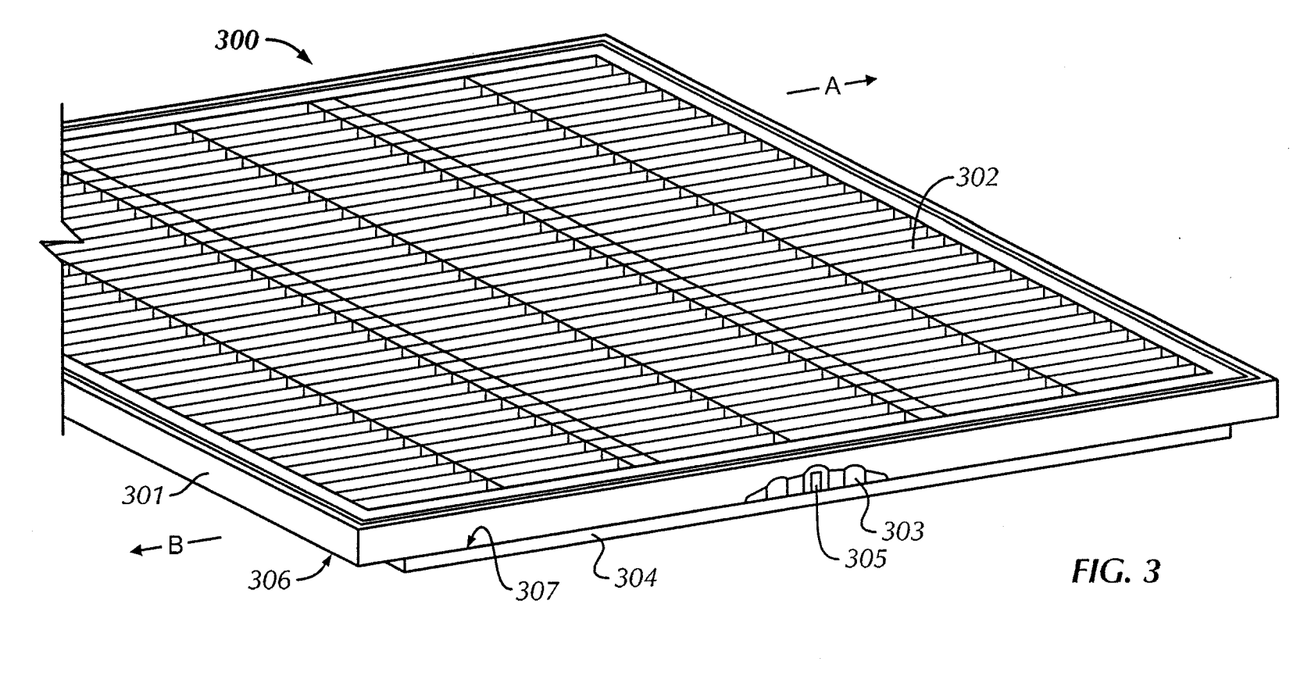
FIG. 3 is a perspective view of a vibratory separator screen according to embodiments of the present disclosure.

Referring to FIG. 3, a perspective view of a screen according to embodiments of the present disclosure is shown. In this embodiment, screen 300 includes a frame 301 and a screening element 302. Screen 300 also includes a tapered recess 303 integrally formed into an end of frame 301. As described above, frame 301 may be formed from a composite material, such that tapered recess 303 may be formed while forming frame 301. In other embodiments, tapered recess 303 may be formed after frame 301 is formed, such as by removing composite, plastic, or polytetrafluoroethylene material from frame 301.

Screen 300 is illustrated disposed on a deck 304 of a vibratory separator (not shown). Deck 304 of the vibratory separator has a locating element 305 extending therefrom. Locating element 305, as illustrated, is an extension member that is configured to be disposed within a receiving portion of screen 300, such as tapered recess 303. However, in other embodiments, pin 305 may include other geometries, such as a raised portion on deck 304, configured to geometrically match the geometry of the tapered recess 303.

During screen installation, replacement, or securing, an operator may engage a bottom surface 306 of screen frame 303 with a top surface 307 of the vibratory separator. The operator may then slide the screen 300 over locating element 305, which extends from top surface 307. As screen 300 slides over top surface 307, locating element 305 contacts tapered recess 303, such that the tapered recess 303 guides the screen 300 into position on the top surface 307 of the vibratory separator.

Because tapered recess 303 extends longitudinally along the side of screen 300, the operator may slide screen 300 in either direction A or direction B when installing, replacing, or securing screen 300. The tapered recess 303 may thereby locate the screen 300 on the vibratory separator as the screen 300 slides over top surface 307. In certain embodiments, screen 300 may have one, two, three, four, or more tapered recesses 303 configured to engage locating element 305 of the vibratory separator. In embodiments having more than one tapered recess 303, the tapered recesses 303 may be disposed on the sides or ends of the screen 300, and each side and/or end of the screen may include one or more tapered recesses. The number of tapered recesses 303 may further be designed to correspond to the number of locating elements 305 on the vibratory separator in which the screen 300 is configured to be installed. However, in certain applications, a screen 300 having more tapered recesses 303 than the vibratory separator has locating elements 305 may be used. In such an application, tapered recess 303 may facilitate the installation of screen 300 into vibratory separator by functioning as a handle, such that an operator may more easily move the screen into location on the vibratory separator.

Figure 4:
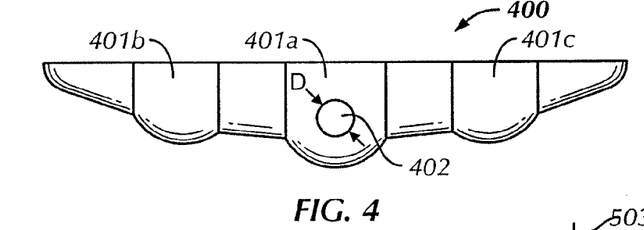
FIG. 4 is a top view of a locating feature according to embodiments of the present disclosure.

Referring to FIG. 4, a close perspective bottom view of a tapered recess 400 of a screen according to embodiments of the present disclosure is shown. As illustrated, tapered recess 400 includes three scalloped sections 401 along the length of the recess. The center scalloped section 401a also includes a terminal location 402 configured to receive a locating element of a vibratory separator. Terminal location 402, in this embodiment, is a circular recess having a specified diameter D. Diameter D is selected based on a corresponding diameter of a locating element of a vibratory separator. Thus, during installation of a screen frame having tapered recess 400, the locating element (not shown) of a vibratory separator may slide along tapered recess 400 and be moved into position within the terminal location 402 by scalloped sections 401. When the locating element is within center scalloped section 401a, the locating element of the vibratory separator may engage terminal location 402 (e.g., the protrusion is inserted in the circular recess). Because the locating element (not shown) of the vibratory separator has a corresponding geometry to terminal location 402, when the locating elements engages terminal location 402, the screen will be properly aligned and secured on the vibratory separator.

Those of ordinary skill in the art will appreciate that terminal location 402 may be any geometry that corresponds to a locating element of a vibratory separator. Thus, in certain aspects, terminal location 402 may include, for example, substantially square, circular, triangular, or irregular geometric profiles. In other aspects, terminal location 402 may have a larger diameter D than a corresponding locating element. Additionally, as discussed below, in certain aspects, tapered recess 400 may not have a terminal location, and center scalloped section 401 may be sufficient to secure the screen to the vibratory separator.

Figure 5:
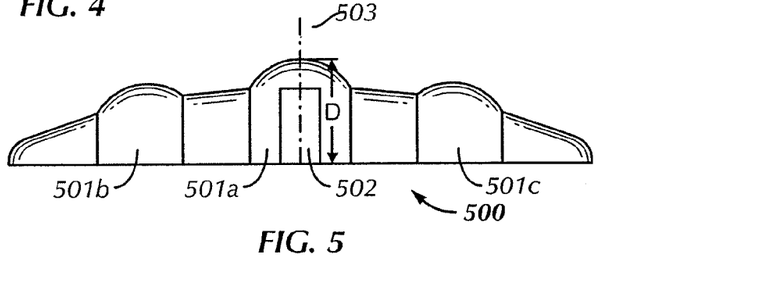
FIG. 5 is a side view of a locating feature according to embodiments of the present disclosure.

Referring to FIG. 5, a side perspective view of a tapered recess 500 according to embodiments of the present disclosure is shown. In this embodiment, tapered recess 500 includes three scalloped sections 501, including a center scalloped section 501a. As illustrated, tapered recess 500 is configured to allow a locating element 502 of a vibratory separator to engage center scalloped section 501a. In this embodiment, tapered recess 500 does not include a terminal location (402 of FIG. 4). Thus, when a screen having tapered recess 500 is installed in a vibratory separator, locating element 502 may slide along the length of the recess 500 along one or more scalloped sections 501b and 501c until the locating element reaches scalloped section 501a, and engages therein. When locating element 502 is within scalloped section 501a, the screen is considered properly positioned and secured within the vibratory separator, and the vibratory separator may be actuated.

As illustrated, center scalloped section 501a may have a greater depth d than scalloped sections 501b and/or 501c. Because center scalloped section 501a has a greater depth than scalloped sections 501b and/or 501c, the screen may continue to slide along a top surface of a vibratory separator until the locating element is within center scalloped section 501a. When the locating element is within center scalloped section 501a, because of the depth of center scalloped section 501a, the side surfaces of the screen may be flush with other screens installed in the vibratory separator. In alternate configurations, each of scalloped sections 501 may have different depths, the depths may be substantially consistent, or more or less than three scalloped sections may be present within the tapered recess 500.

Center scalloped section 501a, as illustrated, includes a concave center portion 503. Because the center portion is concave, as a locating element 502 slides along tapered recess 500, the locating element 502 will settle toward the center of the center portion. Thus, concave center portion 503 directs locating element 502 along both longitudinal and latitudinal axes, such that locating element 502 engages center scalloped section 501a, thereby securing the screen to the vibratory separator.

Figure 6:
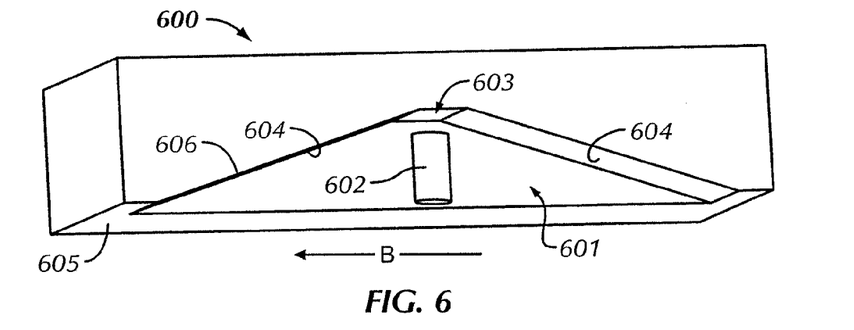
FIG. 6 is a side view of a locating feature according to embodiments of the present disclosure.

Referring to FIG. 6, a side view of a tapered recess 601 according to embodiments of the present disclosure is shown. In this embodiment, screen frame 600 includes a tapered recess 601. Tapered recess 601 includes an angled sidewall 604 configured to allow a locating element 602 of a vibratory separator to slide therealong until the locating element 602 engages a terminal location 603. For example, during installation, if screen frame 600 is slid in direction B into a vibratory separator, locating element 602 would initially contact screen frame 600 at an initial location 605. The locating element 602 would then engage tapered recess 601, and slide along sidewall 604 at medial position 606. After sliding along sidewall 604, the locating element comes to rest at terminal location 603, and the screen is considered installed within the vibratory separator.

Figure 7:
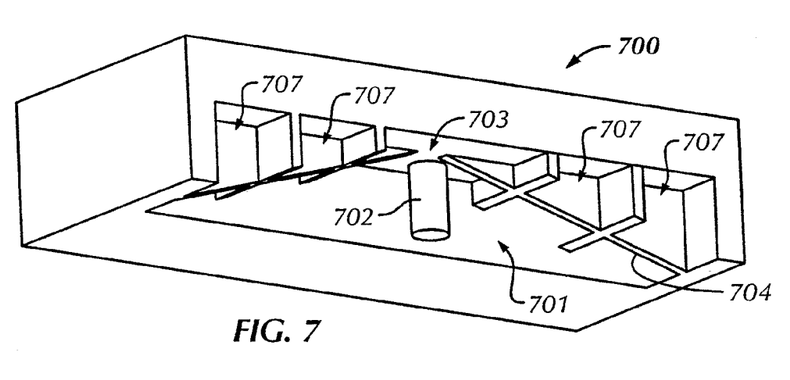
FIG. 7 is a side view of a locating feature according to embodiments of the present disclosure.

Referring to FIG. 7, a side view of a tapered recess 701 according to embodiments of the present disclosure is shown. In this embodiment, screen frame 700 includes tapered recess 701 having an angled sidewall 704 and a plurality of box portions 707. In this embodiment, a locating element 702 of a vibratory separator may slide along sidewall 704 until it engages a stationary terminal location 703 (i.e., the terminal location does not move). Box portions 707 may increase the structural integrity of tapered recess 701, while allowing locating element 702 to slide into terminal location 703, such that the screen is secured within the vibratory separator. Those of ordinary skill in the art will appreciate that the diameter of locating element 702, if the locating element 702 is circular, may be larger than the box portions 707, such that the locating element 702 does not become stuck prior to reaching terminal location 703. In such an embodiment, locating element 702 may also be of a geometry to allow the locating element 702 to slide uninhibited by box portions 707 until it reaches terminal location 703.

Figure 8:
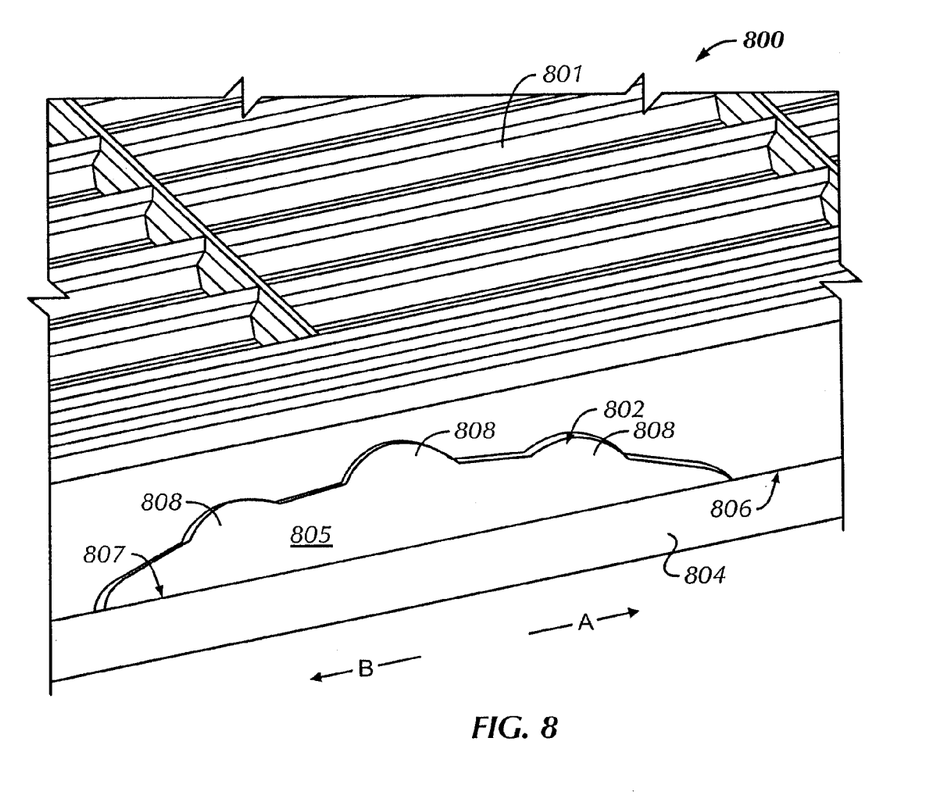
FIG. 8 is a perspective view of a screen according to embodiments of the present disclosure.

Referring to FIG. 8, a side view of a screen disposed on a vibratory separator according to embodiments of the present disclosure is shown. In this embodiment, screen 800 includes a frame 801 having a tapered recess 802 integrally formed into an end of frame 801. Screen 800 is illustrated disposed on a deck 804 of a vibratory separator (not shown). Deck 804 of the vibratory separator has a locating element 805 extending therefrom. Locating element 805, as illustrated, has a geometry correspond to tapered recess 802.

During screen installation, replacement, or securing, an operator may engage a bottom surface 806 of screen frame 801 with a top surface 807 of locating element 805 of the vibratory separator. The operator may then slide the screen 800 over locating element 805, which extends from top surface 807. As screen 800 slides over top surface 807, locating element 805 contacts tapered recess 802, such that the tapered recess 802 guides the screen 800 into position on the top surface 807 of the vibratory separator.

Because tapered recess 802 extends longitudinally along the side of screen 800, the operator may slide screen 800 in either direction A or direction B when installing, replacing, or securing screen 800. The tapered recess 802 may thereby locate the screen 800 on the vibratory separator as the screen 800 slides over top surface 807. In certain embodiments, screen 800 may have multiple tapered recesses 802 configured to engage locating element 805 of the vibratory separator, such as a tapered recess 802 on each side of screen 800.

The corresponding geometries of locating element 805 and tapered recess 802 may allow the screen to engage a vibratory separator more securely than other locating element configurations. Such embodiments may increase the contact area between the screen and the vibratory separator, thereby decreasing the likelihood of the screen slipping during operation of the vibratory separator. Furthermore, locating element 805 having scalloped sections 808 that correspond to a scalloped profile of tapered recess 802 may allow such a configuration to easily slide into orientation in a vibratory separator, hold the screen 800 in place during operation of the vibratory separator, and allow for ease of removal of screen 800 when an operator so desires. In other aspects, tapered recess 802 and/or or locating element 805 may include other corresponding geometries, such as oblong or curvilinear profiles.

During installation of a screen into a vibratory separator, an operator initially engages a bottom surface of a screen frame with a top surface of the vibratory separator. The operator then slides the screen frame over the top surface of the vibratory separator until the screen frame contacts a locating element of the vibratory separator. As the operator continues to slide the screen frame along the top surface of the vibratory separator, the locating element comes into contact with a tapered recess of the screen frame, and the tapered recess guides the screen frame into position in the vibratory separator.

As the locating element contacts the tapered recess, a tapered recess having contoured sides directs the locating element along both longitudinal and latitudinal axes. Thus, even if the screen is not slid into the vibratory separator at the correct orientation, the tapered recess corrects the orientation of the screen, such that the final placement of the screen in the vibratory separator is at the correct orientation. Those of ordinary skill in the art will appreciate that a correct orientation includes the screen being centered within the vibratory separator, wherein the screen is flush with other screens and/or end section of the vibratory separator. In certain embodiments, the operator may continue to slide the screen onto the vibratory separator until a terminal location of the tapered recess catches the locating element. Such a terminal location may be formed in a center portion of the tapered recess, and may further secure the screen to the vibratory separator.

Advantageously, embodiments of the present disclosure provide for screens for vibratory separators that are self-locating during installation. Screens having locating features, such as tapered recesses, may be easier to move into position during screen installation. Additionally, such tapered recesses may make removal of the screen easier, as an operator may slide the screen out of the vibratory separator the same way the screen was installed. Furthermore, an operator may use the tapered recesses as handles during installation and removal, thereby allowing for easier screen changes.

Also advantageously, screen attachment systems, such as those having a tapered recess on a screen and a corresponding locating element on a vibratory separator, may provide a more secure connection between the screen and the vibratory separator. By increasing the surface area of the connection between the screen and the vibratory separator, the screen may be less likely to become loose during operation of the vibratory separator. Additionally, the increased surface area may allow the screen to be orientated on the vibratory separator more accurately, thereby improving the seal between the screen and the vibratory separator. By improving the seal, less drilling fluid may be lost through the side of the screen and the vibratory separator. Such advantages may further decrease wear of vibratory separator components.

Also advantageously, embodiments of the present disclosure may allow for methods of installing screens onto vibratory separators that allow the screens to locate within the vibratory separators in more than one direction. For example, the contoured geometry of certain embodiments may allow a locating element to locate in both longitudinal (front-to-back) and latitudinal (side-to-side) directions. Such locating features may thereby improve the orientation of the screen within the vibratory separators, thereby improving the seal between the screen and the vibratory separator.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

The invention claimed is:

1. A method comprising:
   engaging a bottom surface of a screen frame with an upper surface of a deck of a vibratory separator;
   sliding the screen frame over a locating element disposed on the top surface of the vibratory separator; and
   contacting the locating element of the vibratory separator with a tapered recess of the screen frame; and
   guiding the tapered recess of the screen frame disposed longitudinally along an end of the screen frame against the locating element of the vibratory separator in a direction parallel to a direction of a taper of the tapered recess and in a direction parallel to the sliding of the screen frame and into a terminal location of the tapered recess of the screen frame, thereby positioning the screen frame on the vibratory separator.

2. The method of claim 1, wherein the contacting comprises:
   sliding the locating element into contact with the tapered recess along both a latitudinal and longitudinal axis.

3. The method of claim 1, wherein the contacting comprises:
 catching the locating element in a terminal location of the tapered recess.

4. The method according to claim 3, wherein the catching comprises:
 inserting the locating element into the terminal location.

5. The method according to claim 4, wherein the locating element is a protrusion and the terminal location is a circular recess.

6. The method of claim 1, wherein the contacting comprises: locating the screen frame on the top surface of the vibratory separator.

7. The method according to claim 1, further comprising:
 disposing a screen element on the screen frame prior to engaging the bottom surface of the screen frame with the upper surface of the deck of the vibratory separator.

8. The method according to claim 1, wherein the screen frame is comprised of a composite material.

9. The method according to claim 8, further comprising:
 integrally forming the tapered recess from the composite material of the screen frame prior to contacting the locating element with the tapered recess.

10. The method according to claim 1, wherein the tapered recess comprises at least one selected from one or more angled edges, one or more scalloped cross-sections and one or more concave portions.

11. The method according to claim 1, further comprising:
 configuring a geometry of the locating element to geometrically match a geometry of the tapered recess prior to contacting the locating element with the tapered recess.

12. A screen attachment system, the system comprising:
 a vibratory separator including a basket, the basket comprising:
  a locating element wherein the locating element is disposed on and extending upwardly from a top surface of a deck; and
  a screen frame, including an outer edge portion having a first end, a second end, a top surface, and a bottom surface, a bottom surface of the first end comprising:
   a recessed portion configured to receive the locating element of the deck, the recessed portion formed along a length of the first end of the outer edge portion of the screen frame, wherein a height of the recessed portion changes with a longitudinal position along the length of the first end of the outer edge portion of the screen frame, wherein the locating element is a pin having two ends, wherein a first end of the pin is coupled to the top surface of the deck and a second end of the pin engages the recessed portion at a maximum height of the recessed portion.

13. The screen attachment system of claim 12, wherein the recessed portion comprises at least one selected from a tapered profile, one or more angled edges, one or more scalloped cross-sections and one or more concave portions.

14. The screen attachment system of claim 12, wherein the bottom surface of the screen frame further comprises an additional tapered recess.

15. The screen attachment system of claim 12, wherein a screening element is disposed on the screen frame and pretensioned to the screen frame.

16. The screen attachment system of claim 12, wherein the screen frame comprises a composite material.

17. The screen attachment system of claim 16, wherein the recessed portion is integrally formed from the composite material of the screen frame.

18. The screen attachment system of claim 12, wherein the recessed portion comprises a concave center portion.

19. The screen attachment system of claim 12, wherein the recessed portion tapers along both longitudinal and latitudinal axes.

20. The screen attachment system of claim 12, wherein the recessed portion comprises a screen handle.

* * * * *